Sept. 29, 1959    K. C. BRIN    2,906,842
ADJUSTABLE ACTUATOR ARM
Filed March 20, 1958
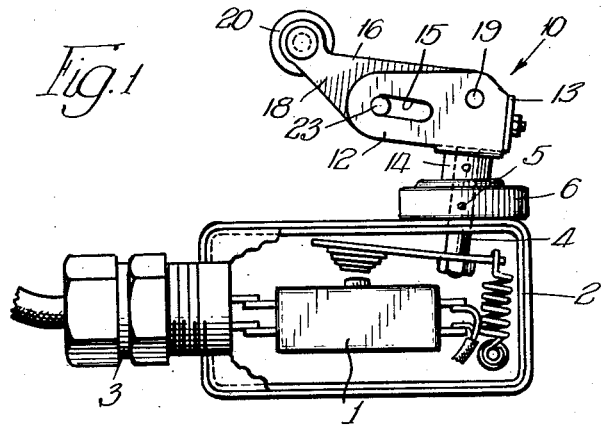
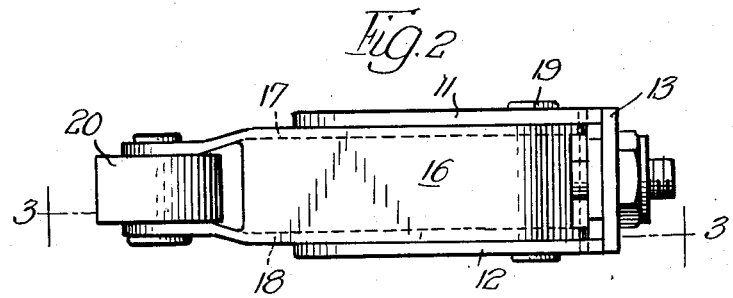
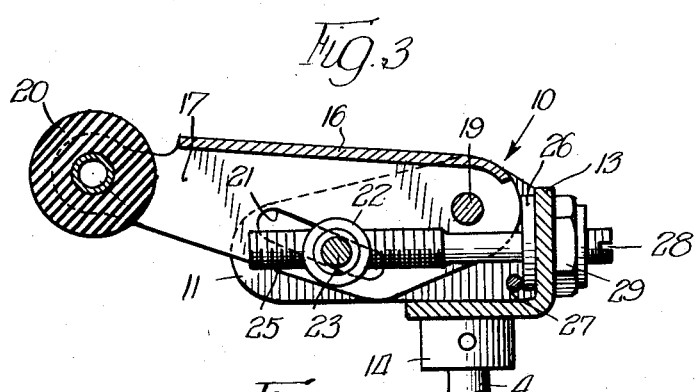
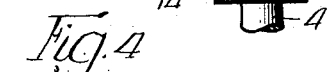
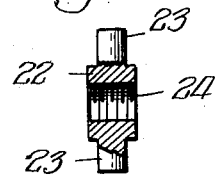
INVENTOR.
Kacil C. Brin,
BY George H. Simmons
Atty.

United States Patent Office 2,906,842
Patented Sept. 29, 1959

2,906,842
ADJUSTABLE ACTUATOR ARM

Kacil C. Brin, Highland Park, Ill., assignor to Electro-Snap Switch & Mfg. Co., Chicago, Ill., a corporation of Illinois Application March 20, 1958, Serial No. 722,769

5 Claims. (Cl. 200—172)

This invention relates to an adjustable actuator arm for electric switches and the like, and has for its principal object the provision of a new and improved device of this kind.

It is a main object of the invention to provide an actuator arm for electric switches and the like, which can be adjusted to a desired position with great accuracy and which can be securely locked in adjusted position, thereby to maintain the adjustment accurately.

Another object of the invention is to provide an actuator arm for electric switches that can be adjusted in situ with simple tools.

Another object of the invention is to provide an adjustable actuator arm for electric switches which is of sturdy construction, which can be manufactured at low cost without sacrificing quality.

Further objects of the invention not specifically mentioned here will be apparent from the detailed description and claims which follow, reference being had to the accompanying drawings in which a preferred embodiment of the invention is shown by way of example only and in which:

Fig. 1 is a side elevational view, partly in section, of the actuator of the present invention applied to an electric switch;

Fig. 2 is a plan view of the actuator drawn to an enlarged scale;

Fig. 3 is a cross sectional view of the actuator taken along the line 3—3 of Fig. 2, looking in the direction of the arrows; and Fig. 4 is a cross sectional view of the operating block of the device.

Electric switches are frequently employed as limit switches by being mounted in a suitable support carried by one of two relatively movable machine parts and having an operating lever upon which an actuating arm is mounted so as to be engaged by the other relatively movable machine part and operated to move the switch from its normal to its operated position when the latter named machine part reaches a predetermined position. The support in which such switches are mounted is frequently in the form of a hermetically sealed casing through a wall of which the operating lever projects and a seal is provided to maintain the casing sealed throughout the operation of the device.

Oftentimes in an installation of this type the electric switch is operated to initiate another operation of the machine, and it will be readily apparent that it will be advantageous oftentimes to provide for accurate adjustment of the actuating arm of the switch so as to operate that switch when the relatively movable machine part reaches a predetermined position which must be determined within close limits. It is to such an actuating arm that the present invention particularly relates.

In order to achieve accurate adjustment of the actuating arm it is essential that the arm be constructed so that it may be adjusted when in engagement with the relatively movable machine part that is to operate it. The adjustable arm of the present invention meets this requirement.

In its preferred form the actuating arm of the present invention consists of two members, the first of which is fixed upon the operating lever of the switch and projected at right angles from the axis thereof. Pivotally mounted upon the first arm is a second arm which carries a roller that is engaged by the relatively movable machine part to operate the switch. To provide for adjustment an adjusting screw carried by the first arm operates a block by which the second arm is rotated upon its pivot relative to the first arm. Through this arrangement the distance between the roller on the second arm and the casing in which the switch mechanism is encased may be varied through a distance sufficient to permit a wide range of adjustment of the mechanism.

The invention will be best understood from the drawings, reference being had thereto, and from Fig. 1 it will be seen that the switch mechanism, indicated generally at 1, is shown to be encased in a boxlike metal casing 2, out of which conductors are led through a suitable terminal member 3. The operating lever 4 of the mechanism is pivoted at 5 and extends beyond the casing 2, there being a hermetic seal 6 through which the lever 4 projects to maintain seal of the casing 2 and at the same time permit movement of the lever 4 around its pivot.

The actuating arm, indicated generally at 10, is fixed upon the lever 4.

As will be seen best in Figs. 2 and 3, the actuator consists of a first arm having side wall portions 11 and 12 and an end wall 13, and the arm is mounted upon a collar 14 that is fixed upon the operating shaft 4 of the switch. Each of the side walls 11 and 12 contains an elongated slot 15, Fig. 1, that is disposed at right angles to the axis of the collar 14 and shaft 4.

The second arm consists of a top 16 and side walls 17 and 18 which are disposed alongside the side walls 11 and 12 respectively. The second arm is mounted upon a pivot 19 that extends between side walls 11 and 12. A roller 20 is journaled in the second arm at the end thereof remote from the pivot 19. Side walls 17 and 18 each contain an elongated slot 21 which is disposed in inclined relation with respect to the slot 15 in the first member and to the axis of the collar 14.

Disposed between the side walls 17 and 18 is an operating block 22 that contains pintles 23 which project into the slots in the side walls of both members. The block 22 contains a threaded opening 24 through which an adjusting screw 25 is extended, the screw 25 also extending through a perforation in the end wall 13 and therebeyond. Fixed upon the screw 25 is a collar 26 that abuts against the end wall 13 and is held thereagainst by a pin 27 that extends between and is fixed in side walls 11 and 12 of the first arm. Screw 25 contains a slot 28 into which a screwdriver or similar tool can be inserted to rotate the screw, thereby to move the operating block 22 and through the engagement of the pintles 23 with the slots in the two arms to rotate the second arm with respect to the first arm around the pivot 19. Rotation of the screw 25 in one direction will thus more the roller 20 away from the casing 2 and rotation of the screw in the opposite direction will move the roller towards the casing. A nut 29 is threaded upon the screw 25 and when drawn up tight against the end wall 13 locks the screw against rotation, thereby to maintain the adjustment.

In the actuator arm shown by way of example, the slots 15 and 21 are of such length and inclined with respect to each other at such an angle as to permit rotation of the second arm and roller 20 around the pivot 19 through an arc of approximately 15°.

With the actuating arm of the present invention installed upon a switch whose casing 2 is fixed upon one machine member, usually the stationary member, not shown, in position so that roller 20 will be engaged by a relatively movable machine member, not shown, it will be apparent that the space between the switch casing and the latter machine member is not great; nevertheless accurate adjustment of the position of the roller relative to the casing 2 can be achieved since it is only necessary to loosen the nut 29 and rotate the screw 25, thereby to move the roller 22 to a desired position.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. An adjustable actuator arm for an electric switch comprising: a collar adapted for mounting upon the operating lever of a switch; a first arm fixed upon said collar and including parallel side walls extending at right angles to the axis of the collar and an end wall extending between said side walls; a second arm pivotally mounted upon the first arm and including side walls disposed alongside the side walls of the first arm, each of said side walls containing an elongated slot registered with a slot in the adjacent side wall of the other arm and disposed at an angle with respect thereto, an operating block disposed between said side walls and containing a threaded opening and pintles that extend through said slots; an adjusting screw threaded through said block and extending through a perforation in said end wall; a collar on said screw engaging said end wall on the face thereof adjacent said block; means for holding said collar against said end wall, said screw being rotatable to move said block and thereby rotate said second arm around its pivot; means for locking said screw against rotation; and a roller journaled in said second arm at the end thereof remote from said pivot.

2. An adjustable arm as specified in claim 1, in which the slots in the side walls of the first arm are disposed at right angles to the axis of the collar and the slots in the side walls of the second arm are inclined with respect to the first arm slots and to said axis.

3. An adjustable arm as specified in claim 1, in which the means for holding the adjusting screw collar against the end wall of the first arm consists of a pin extending between the side walls of the first arm and engaging the face of the collar that is remote from the end wall.

4. An adjustable arm as specified in claim 1, in which the means for locking the screw against rotation consists of a nut threaded upon the screw and bearing against the face of the end wall remote from said screw collar.

5. An adjustable arm as specified in claim 1, in which the slots in the first and second arms are of length sufficient to permit rotation of the second arm around its pivot through an arc of approximately 15 degrees.

References Cited in the file of this patent

UNITED STATES PATENTS

| 2,338,365 | Thorp | Jan. 4, 1944 |
| 2,821,610 | Thomson et al. | Jan. 28, 1958 |

FOREIGN PATENTS

| 698,514 | Great Britain | Oct. 14, 1953 |